(12) United States Patent
Kuroiwa et al.

(10) Patent No.: US 8,043,067 B2
(45) Date of Patent: Oct. 25, 2011

(54) WIND TURBINE BLADE WITH SUFFICIENTLY HIGH STRENGTH AND LIGHT WEIGHT

(75) Inventors: Takao Kuroiwa, Nagasaki-ken (JP); Toshiyuki Hirano, Nagasaki-ken (JP); Nobuyasu Nakamura, Nagasaki-ken (JP)

(73) Assignee: Mitsubishi Heavy Industries, Ltd. (JP)

( * ) Notice: Subject to any disclaimer, the term of this patent is extended or adjusted under 35 U.S.C. 154(b) by 359 days.

(21) Appl. No.: 12/244,223

(22) Filed: Oct. 2, 2008

(65) Prior Publication Data

US 2009/0169392 A1 Jul. 2, 2009

(30) Foreign Application Priority Data

Mar. 24, 2006 (JP) ................... 2006-082936

(51) Int. Cl.
*F03D 11/02* (2006.01)
(52) U.S. Cl. ............... 416/230; 416/223; 416/241 A
(58) Field of Classification Search .............. 416/230, 416/233, 241 A
See application file for complete search history.

(56) References Cited

U.S. PATENT DOCUMENTS

| | | | | | |
|---|---|---|---|---|---|
| 3,171,631 | A | * | 3/1965 | Aspinwall | 416/90 R |
| 3,429,023 | A | * | 2/1969 | Blythe et al. | 29/404 |
| 3,528,753 | A | * | 9/1970 | Dutton et al. | 416/226 |
| 4,449,053 | A | * | 5/1984 | Kutcher | 290/44 |
| 4,976,587 | A | * | 12/1990 | Johnston et al. | 416/230 |
| 5,375,324 | A | * | 12/1994 | Wallace et al. | 29/889.21 |
| 5,474,425 | A | * | 12/1995 | Lawlor | 416/223 R |
| 5,499,904 | A | * | 3/1996 | Wallace et al. | 416/230 |
| 5,755,558 | A | * | 5/1998 | Reinfelder et al. | 416/230 |
| 6,715,992 | B2 | * | 4/2004 | Rinke | 416/230 |
| 7,153,090 | B2 | * | 12/2006 | DeLeonardo et al. | 415/4.2 |
| 7,198,471 | B2 | * | 4/2007 | Gunneskov et al. | 416/229 R |
| 7,322,798 | B2 | * | 1/2008 | Cairo | 416/229 R |
| 7,427,189 | B2 | * | 9/2008 | Eyb | 416/226 |
| 7,473,385 | B2 | * | 1/2009 | Stiesdal et al. | 264/314 |
| 7,503,752 | B2 | * | 3/2009 | Gunneskov et al. | 416/229 R |
| 7,575,417 | B2 | * | 8/2009 | Finn et al. | 416/230 |
| 2004/0253114 | A1 | * | 12/2004 | Gunneskov et al. | 416/224 |
| 2005/0053466 | A1 | * | 3/2005 | Finn et al. | 416/230 |
| 2006/0133937 | A1 | * | 6/2006 | DeLeonardo et al. | 416/132 B |
| 2006/0280613 | A1 | * | 12/2006 | Hansen | 416/230 |
| 2007/0110584 | A1 | * | 5/2007 | Stommel | 416/233 |
| 2009/0324412 | A1 | * | 12/2009 | Roorda | 416/204 R |

FOREIGN PATENT DOCUMENTS

| | | |
|---|---|---|
| JP | 06-066244 | 3/1994 |
| JP | 07-279818 | 10/1995 |
| JP | 2002-357176 | 12/2002 |

OTHER PUBLICATIONS

Tony Burton et al: "Wind Engery Handbook"; John Wiley & Sons, Ltd; Chichester, NY; Dec. 2001.

* cited by examiner

*Primary Examiner* — Edward Look
*Assistant Examiner* — Aaron R Eastman
(74) *Attorney, Agent, or Firm* — Kanesaka Berner and Partners, LLP

(57) ABSTRACT

A wind turbine blade is provided with an outer skin layer formed of fiber-reinforced plastic, and a plurality of main structural members formed of fiber-reinforced plastic integrally with the outer skin layer to extend in a blade length direction. The main structural members include a plurality of main dorsal structural members positioned on a dorsal side of the wind turbine blade, and a plurality of main ventral structural members positioned on a ventral side of the wind turbine blade.

13 Claims, 13 Drawing Sheets

PART I

PART II

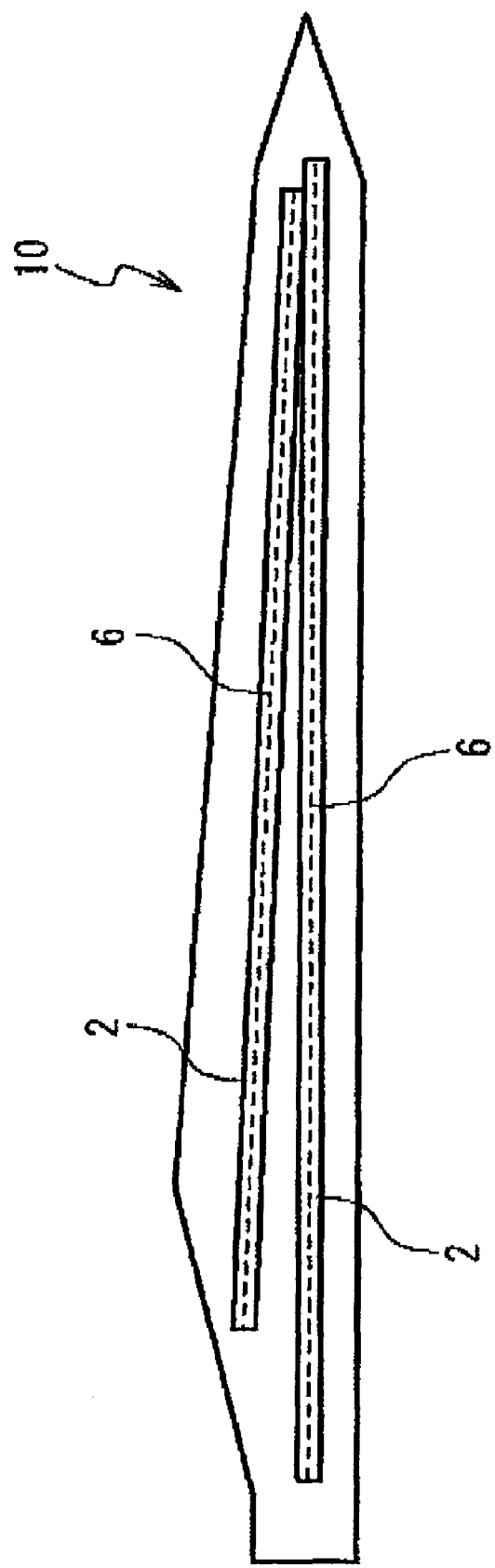

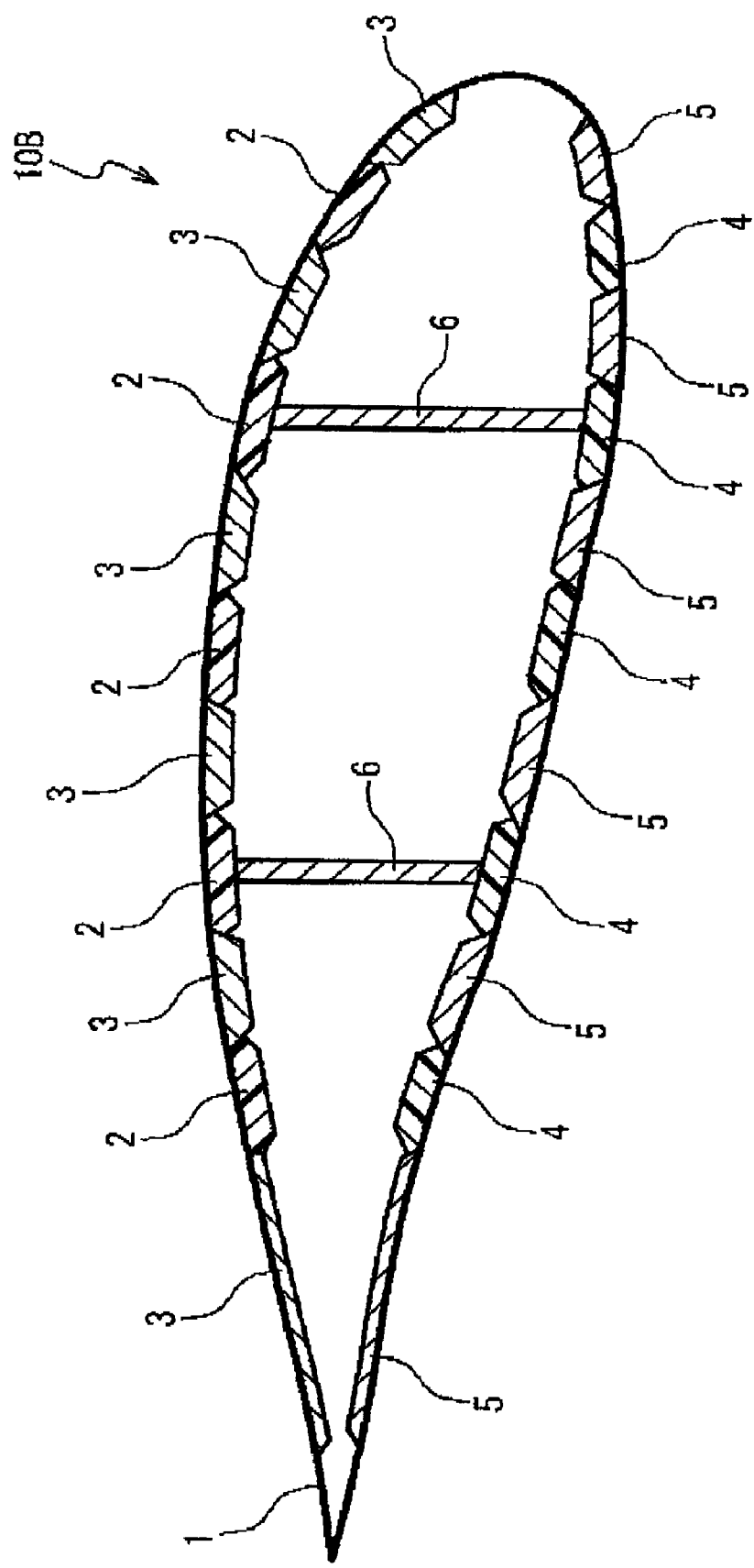

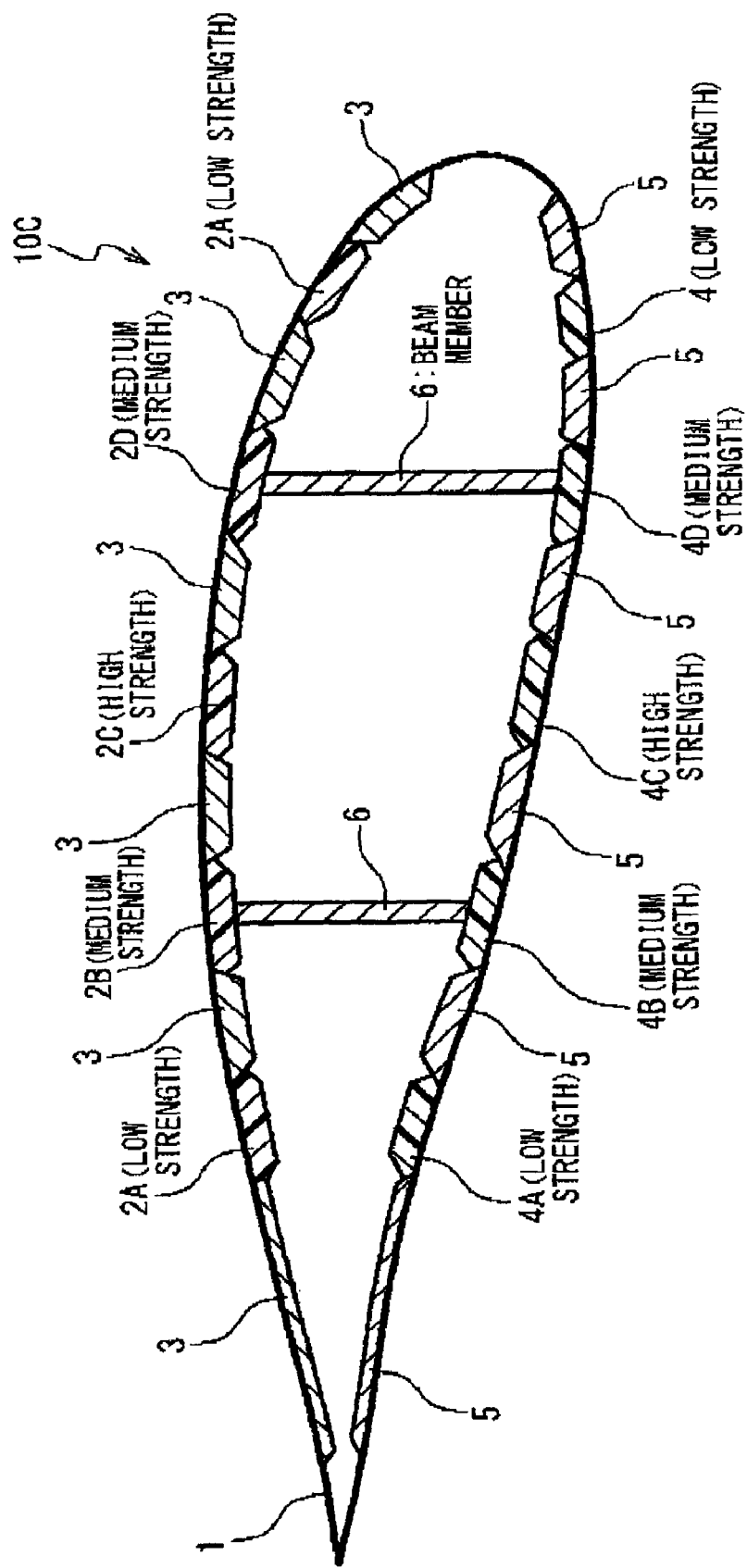

WIND TURBINE BLADE WITH SUFFICIENTLY HIGH STRENGTH AND LIGHT WEIGHT

RELATED APPLICATIONS

The present application is based on, and claims priority from, Japanese Application Number 2006-082936, filed Mar. 24, 2006, the disclosure of which is hereby incorporated by reference herein in its entirety.

BACKGROUND OF THE INVENTION

1. Field of the Invention

The present invention relates to a wind turbine blade, and especially relates to a wind turbine blade preferably used for wind power generation and to a manufacture method thereof.

2. Description of the Related Art

One property required for wind turbine blades is lightweight with sufficient strength. This is important especially to provide large and long wind turbine blades (for example, a length more than 20 meters). To increase the length of a wind turbine blade, the structural strength of the wind turbine blade is required to be sufficiently high. However, the weight increase accompanied by the strength enhancement causes a mechanical load to be applied to the structure supporting wind turbine blades (for example, a nacelle and a tower). For example, a wind turbine blade having a high strength and also an excessive weight cannot be actually employed for a wind turbine.

The spar cap structure is a wind turbine blade structure which is currently widely used to satisfy both requirements of lightweight and strength. The spar cap structure is disclosed, for example, in Tony Burton et al., Wind Energy Handbook, John Wiley & Sons, LTD. U.K. 2001, December, P. 380. FIG. 14A is a cross sectional view showing the structure of the wind turbine blade disclosed by Burton. The disclosed wind turbine blade 10 includes an outer skin layer 101, spar caps (main structural members) 102, lightweight core members 103, and share webs (beam members) 105. One spar cap 102 is provided on each of dorsal and ventral sides of the wind turbine blade 100. The outer skin layer 101 and the spar caps 102 are both formed of fiber-reinforced plastics. On the other hand, the lightweight core members 103 are formed of resin foam such as the PVC or a lumber such as balsa wood. As shown in FIG. 14B, the lightweight core members 103 are sandwiched between the outer skin layer 101 and an inner skin layer 104. In this structure, the strength of the wind turbine blade 100 is mainly maintained by the spar caps 102 formed of fiber-reinforced plastic. The lightweight core members 103 are collaterally used for ensuring the strength. The spar cap structure realizes a wind turbine blade which is lightweight and highly strong by providing the spar caps 102 for ensuring the strength, without increasing the overall thickness of the outer skin layer 101.

The above-described spar cap structure definitely satisfies the requirements for lightweight and sufficient strength to a certain extent. However, a recent wind turbine requires wind turbine blades to be further large and long. In addition, it is increasingly required to manufacture a wind turbine blade at a low cost. It has been becoming difficult for the wind turbine blade employing the spar cap structure to satisfy such requirements.

From such backgrounds, there is a need for a structural design of a wind turbine blade which satisfies both requirements of lightweight and strength at a high level, preferably at a low cost.

SUMMARY OF THE INVENTION

Therefore, an object of the present invention is to provide a wind turbine blade with sufficient strength and lightweight, preferably at a low cost.

In an aspect of the present invention, a wind turbine blade is provided with an outer skin layer formed of fiber-reinforced plastic; and a plurality of main structural members formed of fiber-reinforced plastic integrally with the outer skin layer to extend in a blade length direction. The main structural members include: a plurality of main dorsal structural members positioned on a dorsal side of the wind turbine blade; and a plurality of main ventral structural members positioned on a ventral side of the wind turbine blade.

The wind turbine blade thus structured allows increasing the thickness-to-width ratio of the main structural members, due to the arrangement in which multiple main structural members are dispersed on each of the dorsal and ventral sides. Therefore, the strength to the compressive stress in the direction perpendicular to the blade cross section of the wind turbine blade is enhanced with a minimum weight increase.

The arrangement in which multiple main structural members are dispersed on each of the dorsal and ventral sides is also effective for the cost reduction. In the arrangement in which multiple main structural members are dispersed, optimization of the arrangement of the main structure members allows the main structural members to be shaped in a rectangular shape or an approximately rectangular shape. This allows forming the main structural members with rectangular fiber cloths. The fact that the fiber cloths are shaped in a rectangular shape enhances the utilization ratio of the row material, effectively reducing the manufacture cost. In order to further reduce the manufacture cost, it is preferable that the fiber cloths have the same width in the blade chord direction. When the main structural members are formed of rectangular fiber cloths, the main structural members are preferably shaped in a linear shape extending in the blade length direction.

When the wind turbine blade further include an inner skin layer positioned inside the outer skin layer and coupled integrally with the outer skin layer and a core member sandwiched between the outer skin layer and the inner skin layer, it is preferable that the end surface out of the surfaces of the core member positioned adjacent to a main structural member is oblique to the main surface opposed to the blade surface of the wind turbine blade and the fiber cloths are positioned so that the ends thereof are adjacent to the end surface, and have widths different from each other.

In this case, it is preferable for suppressing the stripping of the fiber cloths that the main and end surfaces of the core member form an obtuse angle, and the widths of the fiber cloths are increased as the distances thereof to the blade surface are decreased.

It is also preferable that the fiber cloths are laminated so that the ends thereof are alternately shifted in opposite directions along the blade chord direction, and the fiber cloths are arranged so that only one end of each of the fiber cloths in the blade chord direction overlaps the end surface.

Preferably, the wind turbine blade further includes a plurality of beam members. In this case, the beam members are provided so as to couple n pieces of the plurality of main dorsal structural members to n pieces of the plurality of main ventral structural members, n being an integer equal to or more than two. The number of beam members may be equal to or different from the number of the main dorsal structural members (and the main ventral structural members). When the main structural members include a plurality of rectangular fiber cloths, the beam members are preferably shaped in a linear shape extending in a blade length direction.

It is preferable that a first main dorsal structural member out of the main dorsal structural members is formed of material having tensile and compressive strengths higher than those of a second main dorsal structural member out of the plurality of main dorsal structural members.

When the number of the main dorsal structural members is equal to or more than three, it is preferable that the first main dorsal structural member is arranged at a medium position of the plurality of main dorsal structural members, and the second main dorsal structural member is arranged closest to a leading edge or a trailing edge of the wind turbine blade among the main dorsal structural members.

Correspondingly, it is preferable that a first main ventral structural member out of the main ventral structural members is formed of material having tensile and compressive strengths higher than those of a second main ventral structural member out of the main ventral structural members.

When the number of the main ventral structural members is equal to or more than three, it is preferable that the first main ventral structural member is arranged at a medium position of the plurality of main ventral structural members, and the second main ventral structural member is arranged closest to a leading edge or a trailing edge of the wind turbine blade, among the main ventral structural members.

The wind turbine blade preferably further includes a reinforcing rib coupled to the outer skin layer.

BRIEF DESCRIPTION OF THE DRAWINGS

FIG. 6C is a plan view showing a preferred arrangement of main structural members 2 and beam members 6;

FIG. 11 is a cross sectional view showing the structure of a wind turbine blade in still another embodiment of the present invention;

FIG. 12 is a cross sectional view showing the structure of a wind turbine blade in still further another embodiment of the present invention;

DESCRIPTION OF THE PREFERRED EMBODIMENTS

Figure 1:
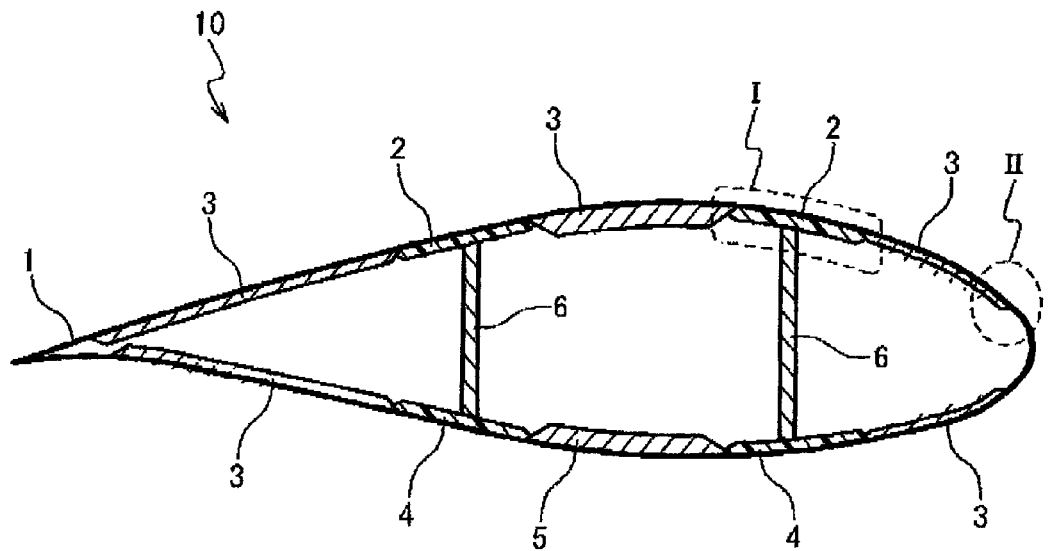
FIG. 1 is a cross sectional view showing the structure of a wind turbine blade in one embodiment of the present invention.

FIG. 1 is a cross sectional view showing the structure of a wind turbine blade 10 in one embodiment of the present invention. The wind turbine blade 10 includes an outer skin layer 1, main structural members 2 and 4, lightweight core members 3 and 5, and beam members 6.

The outer skin layer 1 is used for providing the blade profile of the wind turbine blade 10. The outer skin layer 1 is formed of fiber-reinforced plastics (FRP) such as carbon fiber reinforced plastics (CFRP) and grass fiber reinforced plastics (GFRP).

Figure 2:
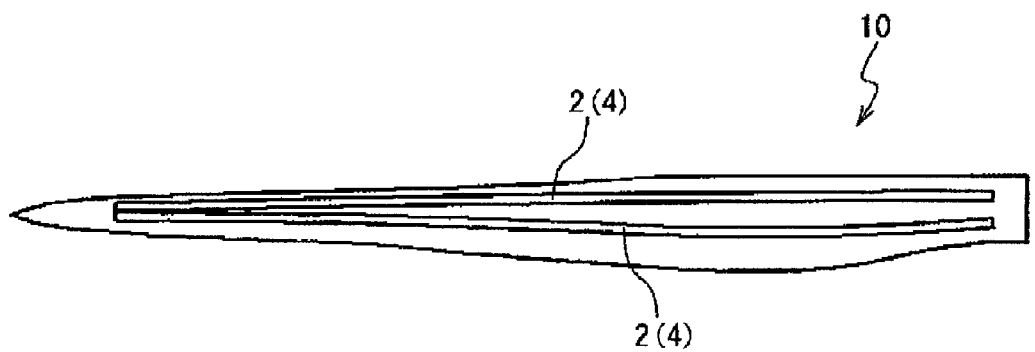
FIG. 2 is a cross sectional view showing the structure of the wind turbine blade of the present embodiment.

The main structural members 2 and 4 are structural bodies for mainly ensuring the strength of the wind turbine blade 10. The main structural members 2 are arranged on the dorsal side of the wind turbine blade 10, and the main structural members 4 are formed on the ventral side of the wind turbine blade 10. As shown in FIG. 2, the main structural members 2 are provided so as to extend in the blade length direction. It should be noted that multiple main structural members 2 are dispersedly arranged on the dorsal side of the wind turbine blade 10, and multiple main structural members 4 are dispersedly arranged on the ventral side of the wind turbine blade 10.

Figure 3A:
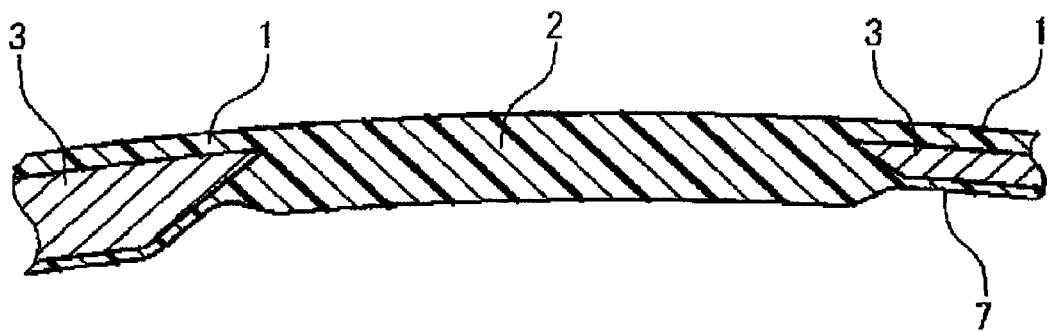
FIG. 3A is an enlarged cross sectional view showing the structure of the wind turbine blade of the present embodiment.

Referring to FIG. 3A, the main structural members 2 and 4 are formed of the fiber-reinforced plastic integrally with the outer skin layer 1. In detail, the outer skin layer 1 and the main structural members 2 and 4 are each formed of laminated fiber cloths infiltrated with resin, and the resin infiltration is simultaneously performed for the outer skin layer 1 and the main structural members 2 and 4.

Referring back to FIG. 1, the lightweight core members 3 and 5 are structural bodies secondarily providing the strength of the wind turbine blade 10. The lightweight core members 3 are arranged on the dorsal side of the wind turbine blade 10, and the lightweight core members 5 are formed on the ventral side of the wind turbine blade 10. In the present embodiment, the lightweight core members 3 and 5 are provided at three positions of the wind turbine blade 10, respectively. The lightweight core members 3 and 5 are formed of light materials with low density, although being inferior in strength to the fiber-reinforced plastics constituting the main structural members 2 and 4. The lightweight core members 3 and 5 may be formed of resin foam such as the PVC or a lumber such as balsa wood.

Figure 3B:
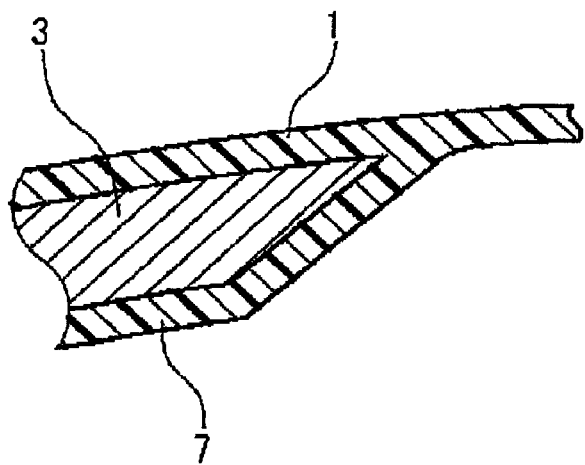
FIG. 3B is an enlarged cross sectional view showing the structure of the wind turbine blade of the present embodiment.

As shown in FIGS. 3A and 3B, the lightweight core members 3 and 5 are formed between the outer skin layer 1 and an inner skin layer 7. The inner skin layer 7 is formed of the fiber-reinforced plastics, and the end of the inner skin layer 7 is integrated with the above-mentioned outer skin layer 1 and main structural members 2 and 4. That is, the resin infiltration to the inner skin layer 7 is performed simultaneously with the resin infiltration of to the outer skin layer 1 and main structural members 2 and 4.

Figure 4:
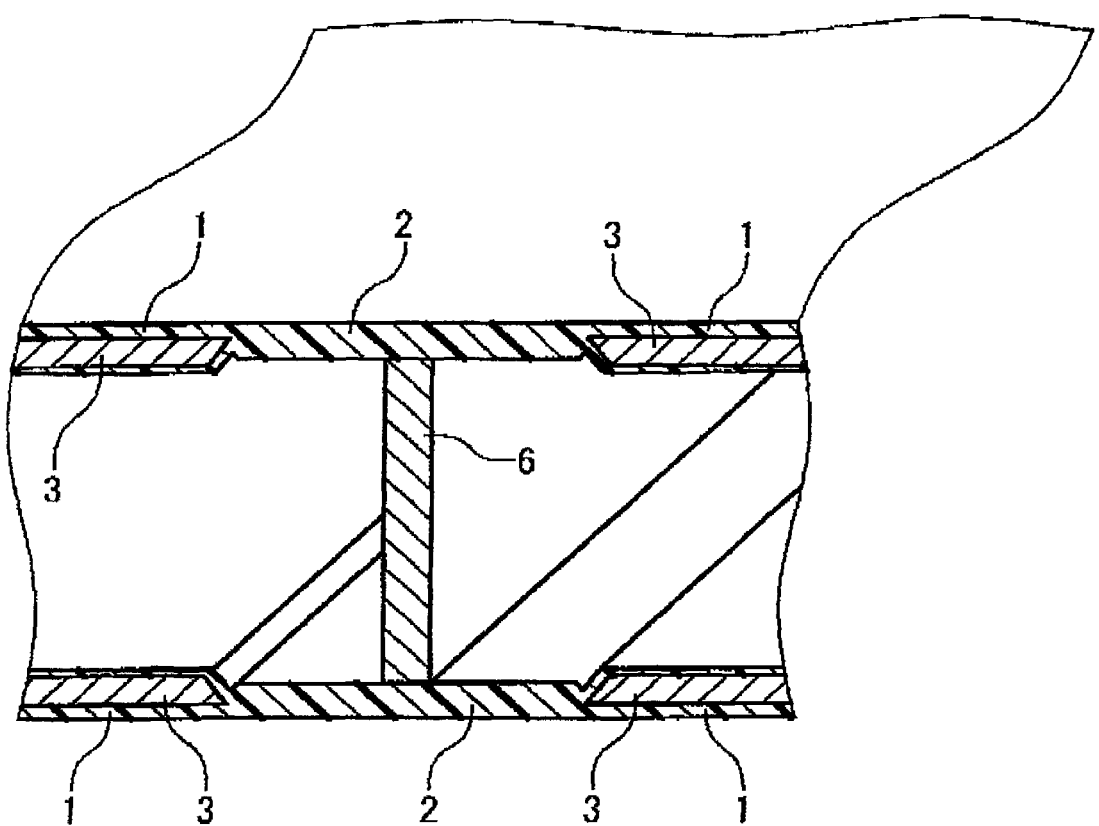
FIG. 4 is an oblique projection view showing the structure of the wind turbine blade of the present embodiment.

Referring back to FIG. 1, the beam members 6 provide mechanical couplings between the main structural members 2 provided on the dorsal side and the main structural members 4 provided on the ventral side, thereby enhancing the strength of the wind turbine blade 10. As shown in FIG. 4, the beam members 6 are formed of fiber-reinforced plastics or of combination of fiber-reinforced plastics and a lightweight core member.

One feature of the wind turbine blade 10 of the present embodiment is that multiple main structural members 2 and 4 are dispersedly arranged on each of the dorsal and ventral sides. The above-described structure allows increasing the ratio of the thickness to the width (in the blade chord direction) of the respective main structural members 2 and 4 for the same total cross section area of the main structural members, in comparison with the spar cap structure in which only one main structural member is provided on each of the dorsal and ventral sides. This allows enhancing the strength to compressive stress in the direction perpendicular to the cross section of the wind turbine blade, suppressing the weight increase at minimum.

Figure 5:
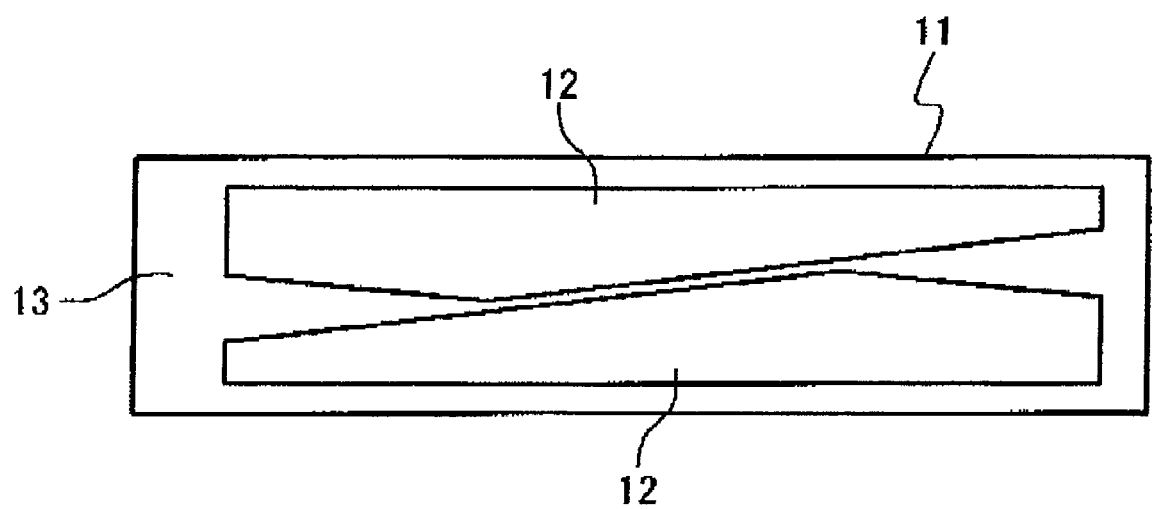
FIG. 5 is a plan view showing an example of a shape of a fiber cloth used for forming a spar cap.

In addition, the structure in which multiple main structural members 2 and 4 are dispersedly arranged on each of the dorsal and ventral sides is also effective for the cost reduction. The spar cap structure, which includes only one main structural member on each of the dorsal and ventral sides, requires to use main structural members of the shapes matching with the cross section of the blade in order to ensure strengths over the whole cross section of the wind turbine blade 10, and thus requires to use fiber cloths 12 of shapes matching with the cross section of the blade as shown in FIG. 5. However, raw material 11 of the fiber cloths 12 is supplied in a rectangular shape, and therefore a lot of unused portions 13 remain when the fiber cloths 12 are cut from the raw material 11. This undesirably increases the cost.

Figure 6A:
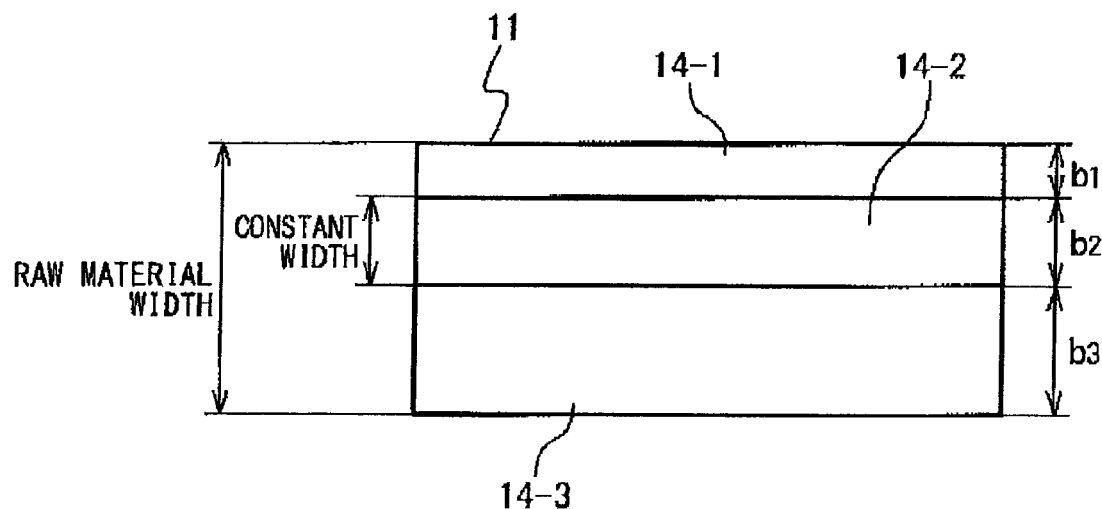
FIG. 6A is a plan view showing an example of a shape of a fiber cloth used for forming a main structural member of the wind turbine blade of the present embodiment.

On the other hand, the structure in which multiple main structural members 2 and 4 are dispersedly arranged on each of the dorsal and ventral sides as described in the present embodiment provides a desired strength while allowing the main structural members 2 and 4 to be shaped in a rectangle shape or an approximately rectangle shape by optimizing arrangements of the main structural members 2 and 4. In the present embodiment, as shown in FIG. 2, the main structural members 2 and 4 near the leading edge of the wind turbine blade 10 are in a rectangular shape and the main structural members 2 and 4 near the tailing edge of the wind turbine blade 10 are in a slightly-bended rectangular shape. In the case where the main structural members 2 and 4 are shaped in a rectangle or an approximately-rectangle shape, the main structural members 2 and 4 can be comprised of rectangular fiber cloths 14-1 to 14-3 as shown in FIG. 6A, allowing the reduction of an unused portion of the raw material 11. This effectively reduces the cost.

Figure 6B:
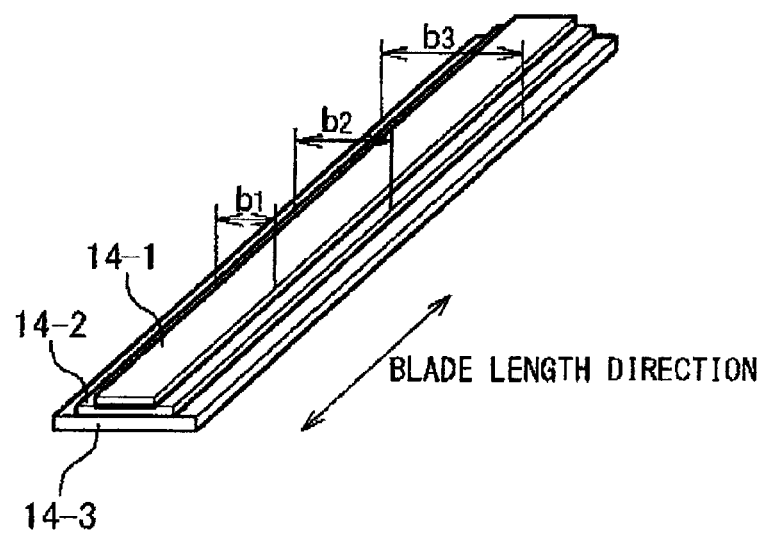
FIG. 6B is an oblique projection view showing a laminated structure of the fiber cloths.

The widths $b_1$, $b_2$ and $b_3$ of the fiber cloths 14-1 to 14-3 used in each of the main structural members 2 and 4 may be different from one another. For example, in a case where the cross section shapes of the main structural members 2 and 4 are trapezoidal, the narrow fiber cloths 14-2 and 14-1 may be laminated on the widest fiber cloth 14-3 subsequently as shown in FIG. 6B.

For further cost reduction, it is preferable that the fiber cloths used in each of the main structural members 2 and 4 have the same width. The fiber cloths with the same width are preferable for efficient use of the raw material 11, and are also effective for simplifying the process of cutting the fiber cloths and thereby reducing efforts of manufacturing.

In a case where the fiber cloths used in the main structural members 2 and 4 are shaped in a rectangle shape, it is preferable that the main structural members 2 and 4 and the beam member 6 are in a linear shape extending in the blade length direction as shown in FIG. 6C; broken lines indicate positions of the beam members 6 in FIG. 6C. When the main structural members 2 and 4 are slightly bended as shown in FIG. 2, wrinkles are easily produced at the bending portions of the fiber cloths. In the structure where the main structural members 2 and 4 and the beam member 6 are not bended as shown in FIG. 6C, on the other hand, the problem of the production of wrinkles at the bending portions of the fiber cloths is avoided.

Figure 7:
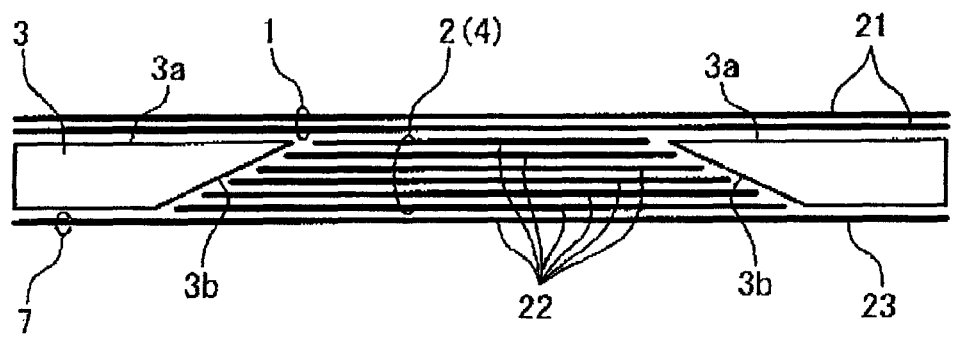
FIG. 7 is a cross sectional view showing a preferred structure of boundary portions between a main structural member and lightweight core members.
Figure 8:
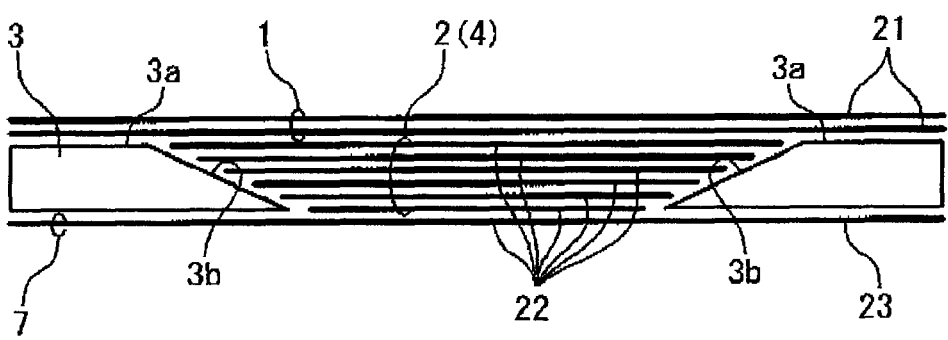
FIG. 8 is a cross sectional view showing another preferred structure of boundary portions between a main structural member and lightweight core members.

The boundary portions between the main structural members 2 and the lightweight core members 3 often suffer from stress concentration, due to the discontinuous changes in the stiffness. To ease the stiffness discontinuation at the boundaries between the main structural members 2 and the lightweight core members 3, it is preferable that the widths of the fiber cloths 22 within the main structural members 2 in the direction of the blade chord gradually differ in the direction perpendicular to the cross section of the blade, as shown in FIGS. 7 and 8. In this case, the ends of the lightweight core members 3 are obliquely cut off. That is, the end portions of the lightweight core members 3 are shaped so as to direct the end surfaces $3b$ obliquely to the main surfaces $3a$ (the face facing the blade surface out of the faces of the lightweight core member 3). In addition, the fiber cloths 22 of the main structural members 2 and the light weight core members 3 are sandwiched between fiber cloths 21 of the outer skin layer 1 and fiber cloths 23 of the inner skin layer 7. Such structure eases the stiffness discontinuation and effectively reduces the stress concentration. This preferably enhances the strength of the wind turbine blade 10.

In one embodiment, as shown in FIG. 7, the main structural members 2 may be structured so that the widths of the fiber cloths 22 are decreased as the decrease in the distance to the blade surface. In this case, the end portions of the light weight core members 3 are formed so that the end surfaces $3b$ form an acute angle with the main surfaces $3a$. The fiber cloths 22 are arranged adjacent to the end surfaces $3b$ of the light weight core members 3.

On the other hand, as shown in FIG. 8, the main structural members 2 may be structured so that the widths of the fiber cloths 22 are decreased as the increase in the distance to the blade surface. In this case, the end portions of the light weight core members 3 are formed so that the end surfaces $3b$ form an obtuse angle with the main surfaces $3a$. The structure shown in FIG. 8 is also preferable in terms of reduction of stripping of the end portions of the fiber cloths 22. When the outer skin layer 1, the main structural members 2, and the inner skin layer 7 are integrally molded, the fiber cloths 21, 22, and 23 and the light weight core members 3 are pressed to a mold in the state in which the fiber cloths 21 of the outer skin layer 1 are contacted to the mold. Accordingly, the ends of the fiber cloths 22 in the main structural members 2 are pressed to the mold by the end surfaces $3b$ of the light weight core members 3. This preferably reduces the stripping of the end portions of the fiber cloths 22.

Figure 9:
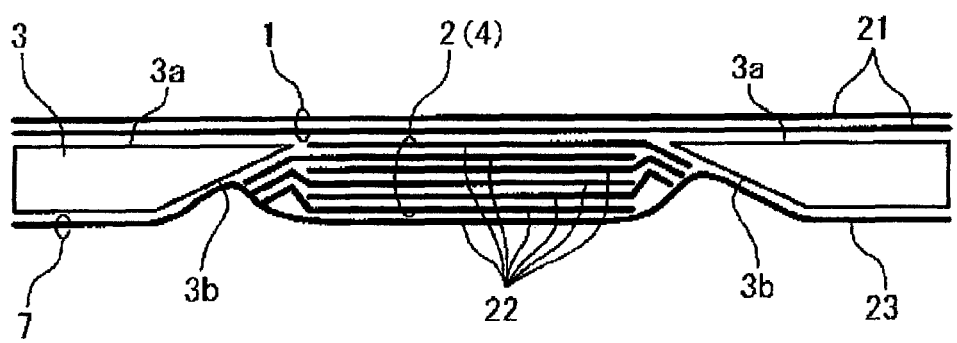
FIG. 9 is a cross sectional view showing still another preferred structure of the boundary portion between the main structural member and the lightweight core member.

In order to ease the discontinuation of the stiffness, as shown in FIG. 9, it is preferable that the fiber cloths 22 with the same width may be laminated with the positions thereof alternately shifted in the opposite directions along the blade chord. In this case, the respective fiber cloths 22 are arranged so that the ends thereof overlap one of the end surfaces 3b of the two lightweight core members 3 sandwiching the main structural member 2. Such structure is also preferable for the reduction of the manufacture cost in addition to the ease of the discontinuation of the stiffness and the suppression of the stress concentration. As described above, the fiber cloths 22 with the same width are preferable for the efficient use of the raw material 11, and are additionally effective for simplifying the process of cutting the fiber cloths and thereby reducing efforts of manufacturing.

It would be apparent to the person skilled in the art that the structures shown in FIGS. 7 to 9 are applicable to boundary portions between the main structural members 4 and the light weight members 4 on the ventral side.

Figure 10:
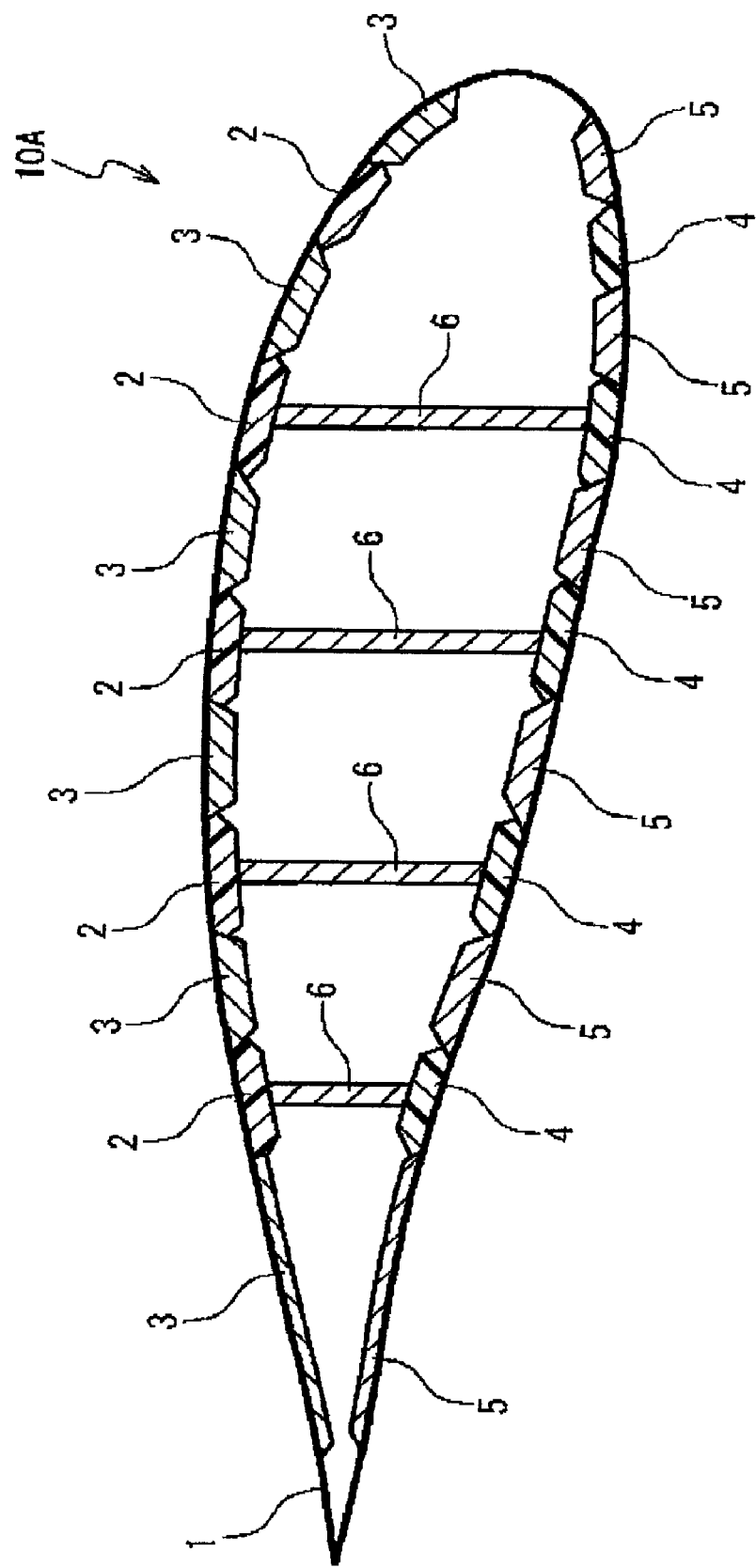
FIG. 10 is a cross sectional view showing the structure of a wind turbine blade in another embodiment of the present invention.

Although FIG. 1 shows a structure in which two main structural members 2 and two main structural members 4 are provided on the dorsal and ventral sides, respectively, more than two main structural members 2 and more than two main structural members 4 may be provided on the dorsal and ventral sides, respectively. FIG. 10 shows a wind turbine blade 10A in which five main structural members 2 and five main structural members 4 are provided respectively on the dorsal and ventral sides. Although the beam members 6 are provided between respective pairs of the main structural members 2 and 4 in the wind turbine blade 10A in FIG. 10, the beam members 6 are not necessarily provided for all the pairs of the main structural members 2 and 4. As shown in FIG. 11, the beam members 6 may be provided only for some not all pairs of the main structural members 2 and 4 of the wind turbine blade 10B. It is preferable, however, to provide the beam members 6 between at least two pair of the main structural members 2 and 4 to ensure strength of the wind turbine blade 10B. When weight reduction has to be emphasized, it is preferable that the beam members 6 are coupled between only two pairs of the main structural members 2 and 4 of the wind turbine blade 10B.

In order to achieve both of cost reduction and strength assurance at the same time, it is preferable to properly determine strength of materials constituting the main structural members 2 and 4, especially tensile and compressive strengths, on the basis of the positions of the main structural members 2 and 4 as shown in FIG. 12. In a wind turbine blade 10c shown in FIG. 12, main structural members 2A and 4A closest to the leading edge and the tailing edge of the wind turbine blade 10C are formed of FRP having relatively low tensile and compressive strengths (for example, GFRP), and main structural members 2C and 4C positioned at the center of the wind turbine blade 10C are formed of FRP having relatively high tensile and compressive strengths (for example, CFRP). The FRP having relatively medium tensile and compressive strengths (for example, hybrid FRP of CFRP and GFRP) may be used for the main structural member 2B positioned between the main structural members 2A and 2C. The selective use of FRP which is expensive but has a high strength (for example, the CFRP) only for portions requiring high strength achieves both of the cost reduction and strength assurance at the same time.

Figure 13A:
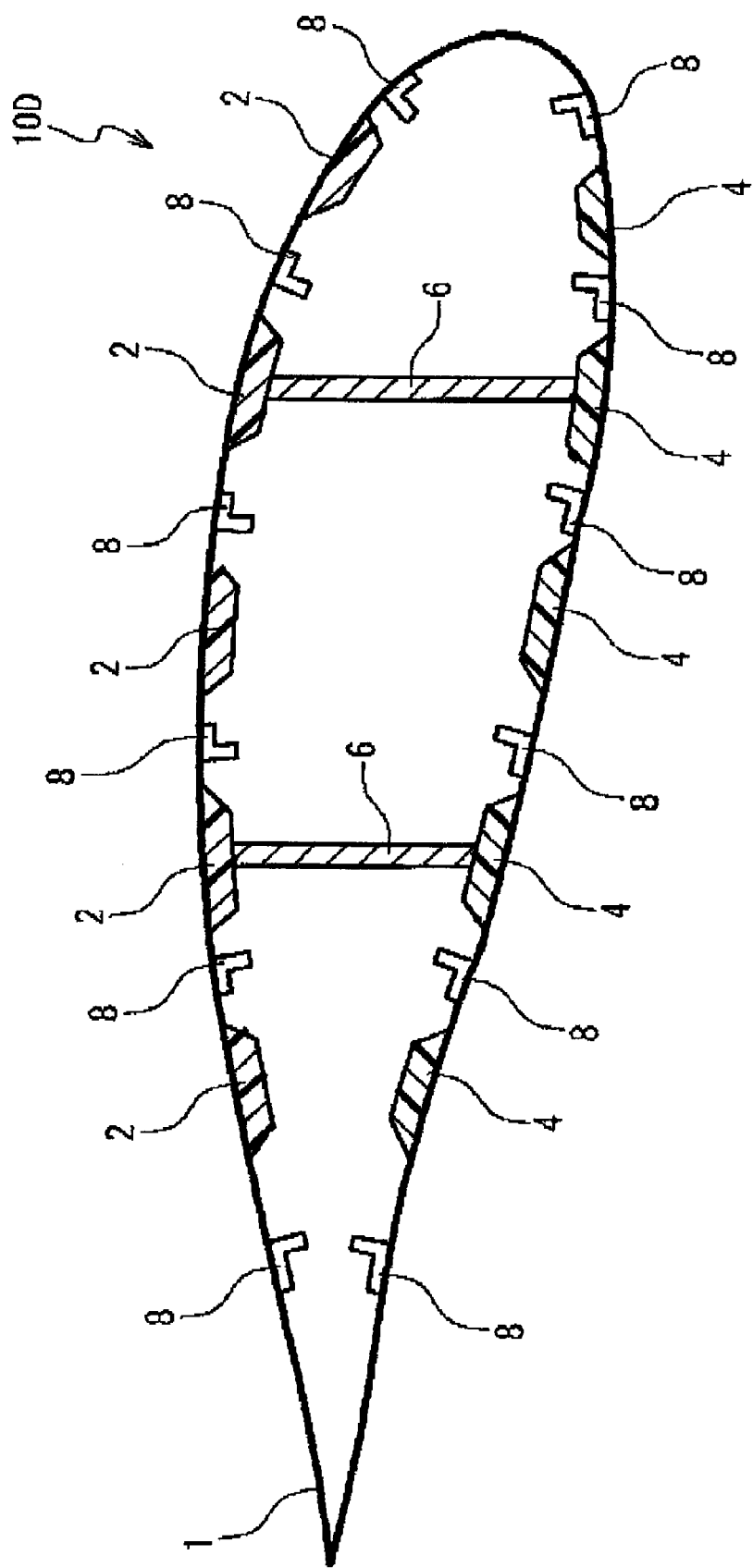
FIG. 13A is a cross sectional view showing a structure of a wind turbine blade in still further another embodiment of the present invention.
Figure 13B:
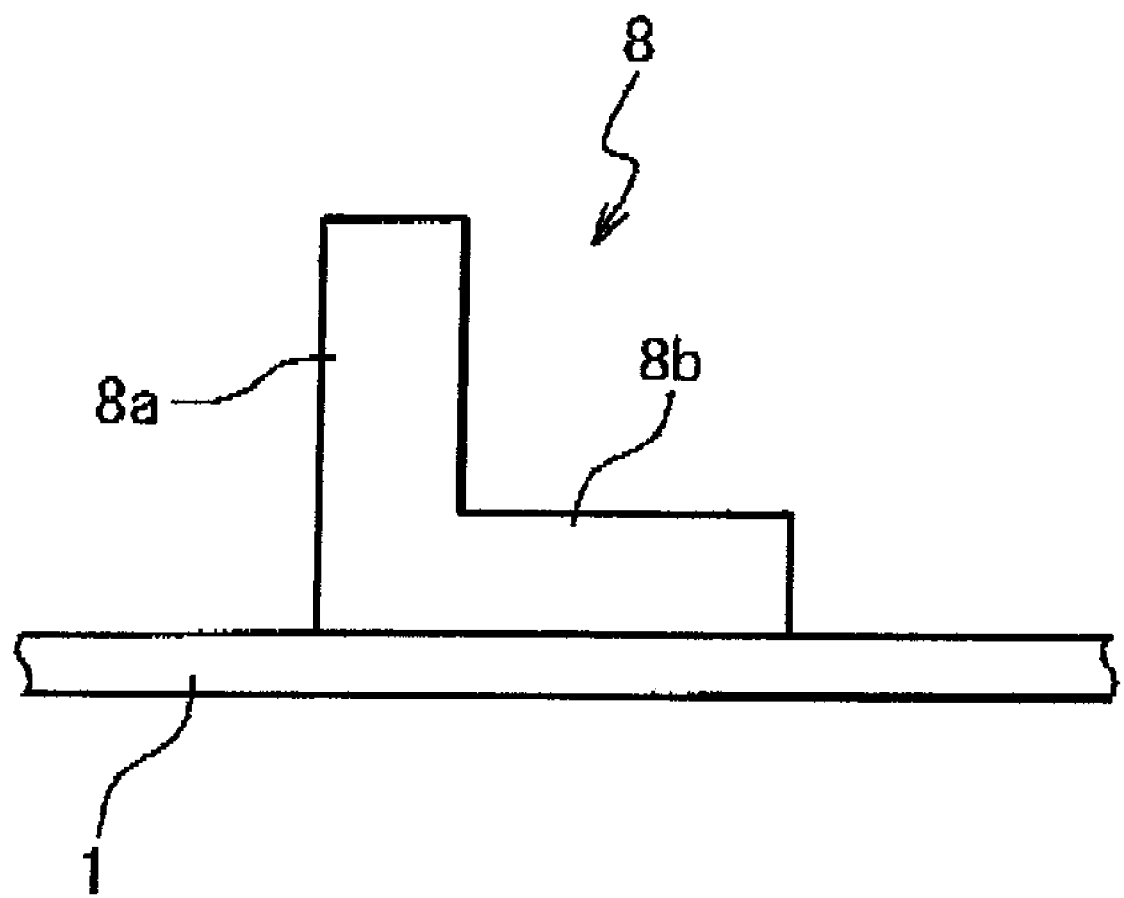
FIG. 13B is an enlarged cross sectional view showing a structure of a reinforcing rib used for the wind turbine blade in FIG. 13A.
Figure 14A:
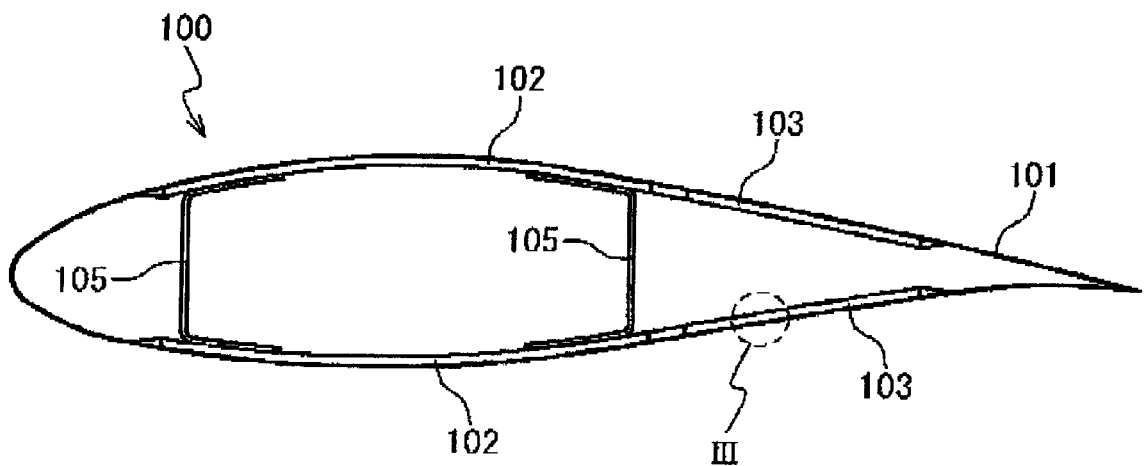
FIG. 14A is a cross sectional view showing an example of a structure of a conventional wind turbine blade employing a spar cap structure.
Figure 14B:
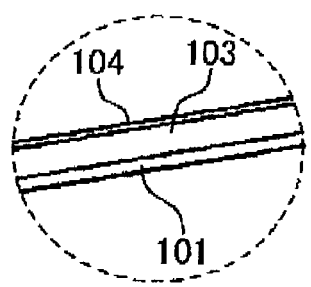
FIG. 14B is an enlarged view of the portion III shown in FIG. 14A.

As shown in FIG. 13, it is also preferable to use a structure in which reinforcing ribs 8 are coupled to the outer skin layer 1 instead of using the structure in which the lightweight core members 3 and 5 are sandwiched between the outer skin layer 1 and the inner skin layer 7. In the wind turbine blade 10D in FIG. 13A, the reinforcing ribs 8 with an L-shaped cross section are used. As shown in FIG. 13B, the reinforcing ribs 8 each include a strength member portion 8a for ensuring strength and a coupling portion 8b for coupling the strength member portion 8a to the outer skin layer 1. The strength member portion 8a has a plate-like shape whose height from the outer skin layer 1 is larger than the thickness thereof. The shape of the reinforcing ribs 8 is not limited to the L-shape; for example, T-shaped reinforcing ribs or right U-shaped reinforcing ribs may be used instead.

What is claimed is:

1. A wind turbine blade comprising:
    an outer skin layer formed of fiber-reinforced plastic;
    a plurality of main structural members formed of fiber-reinforced plastic integrally with said outer skin layer to extend in a blade length direction;
    an inner skin layer positioned inside said outer skin layer and coupled integrally with said outer skin layer; and
    a core member sandwiched between said outer skin layer and said inner skin layer,
    wherein said plurality of main structural members include:
    a plurality of main dorsal structural members positioned on a dorsal side of said wind turbine blade; and
    a plurality of main ventral structural members positioned on a ventral side of said wind turbine blade,
    wherein each of said plurality of main structural members include a plurality of integrated rectangular-shaped fiber cloths which are rectangular in the in-plane shape,
    wherein said core member has a main surface opposed to a blade surface of said wind turbine bladed and an end surface oblique to said main surface,
    wherein said end surface is positioned adjacent to one of said main structural members, and
    wherein said plurality of fiber cloths are positioned so that ends thereof are adjacent to said end surface, and have widths different from each other.

2. The wind turbine blade according to claim 1, wherein said plurality of rectangular-shaped fiber cloths have a same width in a blade chord direction.

3. The wind turbine blade according to claim 1, wherein said plurality of main structural members has a linear shape extending in a blade length direction.

4. The wind turbine blade according to claim 1, wherein said main and end surfaces of said core member form an obtuse angle, and
    wherein widths of said plurality of fiber cloths are increased as distances thereof to said blade surface are decreased.

5. The wind turbine blade according to claim 1, further comprising:
    a plurality of beam members,
    wherein said beam members are provided to couple n pieces of said plurality of main dorsal structural members to n pieces of said plurality of main ventral structural members, n being an integer equal to or more than two.

6. The wind turbine blade according to claim 1, wherein each of said main structural members includes a plurality of rectangular fiber cloths, and wherein said plurality of main structural members and said plurality of beam members have a linear shape extending in a blade length direction.

7. The wind turbine blade according to claim 1, wherein a first main dorsal structural member out of said plurality of main dorsal structural members is formed of material having tensile and compressive strengths higher than those of a second main dorsal structural member out of said plurality of main dorsal structural members.

8. The wind turbine blade according to claim 7,
    wherein a number of said plurality of main dorsal structural members is equal to or more than three, wherein said first main dorsal structural member is arranged at a medium position of said plurality of main dorsal structural members, and wherein said second main dorsal structural member is arranged closest to a leading edge or a trailing edge of said wind turbine blade, among said main dorsal structural members.

9. The wind turbine blade according to claim 1, wherein a first main ventral structural member out of said plurality of main ventral structural members is formed of material having tensile and compressive strengths higher than those of a second main ventral structural member out of said plurality of main ventral structural members.

10. The wind turbine blade according to claim 9, wherein a number of said plurality of main ventral structural members is equal to or more than three, wherein said first main ventral structural member is arranged at a medium position of said plurality of main ventral structural members, and wherein said second main ventral structural member is arranged closest to a leading edge or a trailing edge of said wind turbine blade, among said main ventral structural members.

11. The wind turbine blade according to claim 1, further comprising: a reinforcing rib coupled to said outer skin layer.

12. The wind turbine blade according to claim 1, further comprising: a plurality of shaped reinforcing ribs coupled to said outer skin layer and configured to extend a limited distance into an interior of the wind turbine blade.

13. A wind turbine blade comprising:

an outer skin layer formed of a fiber-reinforced plastic;

a plurality of main structural members formed of fiber-reinforced plastic integrally with said outer skin layer to extend in a blade length direction; and core members coupled to said outer skin layer, wherein said plurality of main structural members include a plurality of main dorsal structural members positioned on a dorsal side of said wind turbine blade; and a plurality of main ventral structural members positioned on a ventral side of said wind turbine blade, wherein each of said plurality of main structural members include a plurality of integrated rectangular-shaped fiber cloths which are rectangular in the in-plane shape, wherein said core members have a main surface opposed to a blade surface of said wind turbine blade and an end surface oblique to said main surface, and wherein said plurality of fiber cloths are laminated so that ends thereof are alternately shifted in opposite directions along a blade chord direction, and said plurality of fiber cloths are arranged so that only one end of each of said plurality of fiber cloths in said blade chord direction overlaps said end surface.

* * * * *